United States Patent
Papalia et al.

(10) Patent No.: US 7,430,459 B1
(45) Date of Patent: Sep. 30, 2008

(54) SYSTEM AND METHOD TO CONTROL DISTRIBUTED POWER GENERATION NETWORK

(75) Inventors: Daniel T. Papalia, Suwanee, GA (US); Doug Morris, Monroe, GA (US)

(73) Assignee: Motorola, Inc., Schaumburg, IL (US)

( * ) Notice: Subject to any disclaimer, the term of this patent is extended or adjusted under 35 U.S.C. 154(b) by 1713 days.

(21) Appl. No.: 09/617,067

(22) Filed: Jul. 16, 2000

Related U.S. Application Data

(60) Provisional application No. 60/178,905, filed on Feb. 1, 2000.

(51) Int. Cl.
*G05D 3/12* (2006.01)
*G06F 17/00* (2006.01)

(52) U.S. Cl. .................... 700/286; 705/412

(58) Field of Classification Search ........... 705/1, 705/500, 412, 26, 27, 34, 37, 40, 14, 32, 705/39, 400, 9, 10, 11, 7, 8, 29; 700/286, 700/287, 290, 291, 292, 295, 296, 297
See application file for complete search history.

(56) References Cited

U.S. PATENT DOCUMENTS

| | | | | |
|---|---|---|---|---|
| 4,425,628 A | * | 1/1984 | Bedard et al. ................. 708/8 |
| 4,731,547 A | * | 3/1988 | Alenduff et al. .............. 307/85 |
| 4,752,697 A | * | 6/1988 | Lyons et al. .................. 290/2 |
| 5,237,507 A | * | 8/1993 | Chasek ..................... 705/412 |
| 5,260,605 A | * | 11/1993 | Barfield ..................... 307/127 |
| 5,390,068 A | * | 2/1995 | Schultz et al. ............... 705/412 |
| 5,424,894 A | * | 6/1995 | Briscall et al. ................ 361/45 |
| 5,432,710 A | * | 7/1995 | Ishimaru et al. ............. 705/412 |
| 5,510,780 A | * | 4/1996 | Norris et al. ........... 340/825.56 |
| 5,771,161 A | * | 6/1998 | Jackson et al. ................ 363/40 |
| 5,790,391 A | * | 8/1998 | Stich et al. .................... 363/24 |
| 5,974,403 A | * | 10/1999 | Takriti et al. ................ 705/412 |
| 6,021,402 A | * | 2/2000 | Takriti ........................ 705/412 |
| 6,047,274 A | * | 4/2000 | Johnson et al. ............. 705/412 |
| 6,134,124 A | * | 10/2000 | Jungreis et al. ............. 705/412 |
| 6,281,601 B1 | * | 8/2001 | Edelman et al. .............. 307/29 |
| 6,553,418 B1 | * | 4/2003 | Collins et al. ................ 709/224 |

* cited by examiner

*Primary Examiner*—Igor N Borissov
(74) *Attorney, Agent, or Firm*—Hisashi D. Watanabe

(57) ABSTRACT

This invention is a system to control a network of distributed power machines. In one preferred embodiment, the system monitors the prices of electricity and hydrocarbon fuels on the open market. When the system determines that electrical power can be generated from a power machine like a fuel cell more cheaply than from a traditional source like coal-fired steam, the system sends an actuation command to the power machine network. The system also considers other factors, including load shedding arrangements, peak shaving arrangements, local rate structures, and the like. In another embodiment, the system includes a means for aggregating electrical power generated by power machines and selling it on an open market. The system also includes means for bill preparation and presentation. The system is capable of operating in several environments, including a traditional environment, a competitive environment, and a competitive environment.

19 Claims, 4 Drawing Sheets

SYSTEM AND METHOD TO CONTROL DISTRIBUTED POWER GENERATION NETWORK

CROSS-REFERENCE TO RELATED APPLICATIONS

This application claims priority from the following U.S. Provisional Application Ser. No. 60/178,905, filed Feb. 1, 2000, entitled "Business Entity to Control Distributed Generation Assets Via Central Location Using Market Price Fluctuations of Natural Gas and Electricity", the disclosure of which, including all attached documents and appendices, are incorporated by reference in their entirety for all purposes.

This application further claims priority from U.S. patent application Ser. No. 09/553/428, filed Apr. 19, 2000, entitled "Electrical Power Distribution System and Method", the disclosure of which, including all attached documents and appendices, are incorporated by reference in their entirety for all purposes.

This application further claims priority from U.S. patent application Ser. No. 09/594,111, filed Jun. 14, 2000, entitled "Device for Electrical Source Sharing", the disclosure of which, including all attached documents and appendices, are incorporated by reference in their entirety for all purposes.

TECHNICAL FIELD

The present invention relates to electrical power distribution systems and, more specifically, to control means used with distributed generation power systems.

BACKGROUND

Electric power generation and distribution is more than a $200 billion dollar per year business. Electric utilities have traditionally been government-regulated monopolies. Utility companies come in many sizes, with some large enough to supply an entire state, while others serve only local communities. These businesses take on many forms, including corporations, co-operatively-owned utilities, and government owned utilities.

Traditionally, utilities controlled all aspects of making and delivering electricity. A traditional utility, like Duke Power for example, generated, transmitted, and distributed electric power. For instance, a single company might operate coal-fired steam generation plants, hydroelectric plants, and nuclear plants, all which covert various fuels into electricity. The same company would own transformers, power lines, switches and relays, which transmit the electricity from the generation facility to the distribution site. The company also would distribute power to homes and factories by connecting them to a power grid, supplying a meter, and billing a customer for power consumed.

Today, however, state governments are beginning to deregulate the power industry in an effort to encourage competition. As of spring 2000, all fifty states have begun to investigate competitive power markets at the retail level. In fact, eighteen states, including New York, Virginia, and California, have enacted pilot programs deregulating utility markets.

As a result of deregulation, "traditional" utility companies are shifting paradigms. For example, companies who feel that their strongest asset is generating electricity may sell their transmission and distribution assets to others. Thus, while in the past a single company provided power, today there may be a distribution company, a generation company, a transmission company, a meter reading company, and a billing company.

One problem with this "multi-faceted" power organization is that each company is dependent upon another for success. For example, if the generation company stops producing power, the entire power chain ceases to function. When the power goes out, customers can be literally left in the dark for days or weeks at a time. Recently, in Atlanta, Ga., more than 500,000 customers were without power in an ice storm for more than five days. During this time the average daytime temperature was below 15 degrees Fahrenheit.

Although some homes have local generators, these generators are usually kept on hand for emergency power outages. Configuration of local generators is usually done manually, with local generation being employed during a power outage and the utility power grid being employed once power is restored to the grid. Aside from emergency usage, local generation of electricity using small generators at the consumer's home is not currently widespread because there is no system that efficiently causes power to be supplied by a local generator when local generation is less expensive and supplied by the power grid when local generation is more expensive. For this reason, many homeowners cannot justify the investment in a generator for backup power only.

Therefore, there is a need for a system that determines optimal times to actuate alternative power devices based on economic factors such as the relative costs to generate.

DETAILED DESCRIPTION OF THE INVENTION

Figure 1:
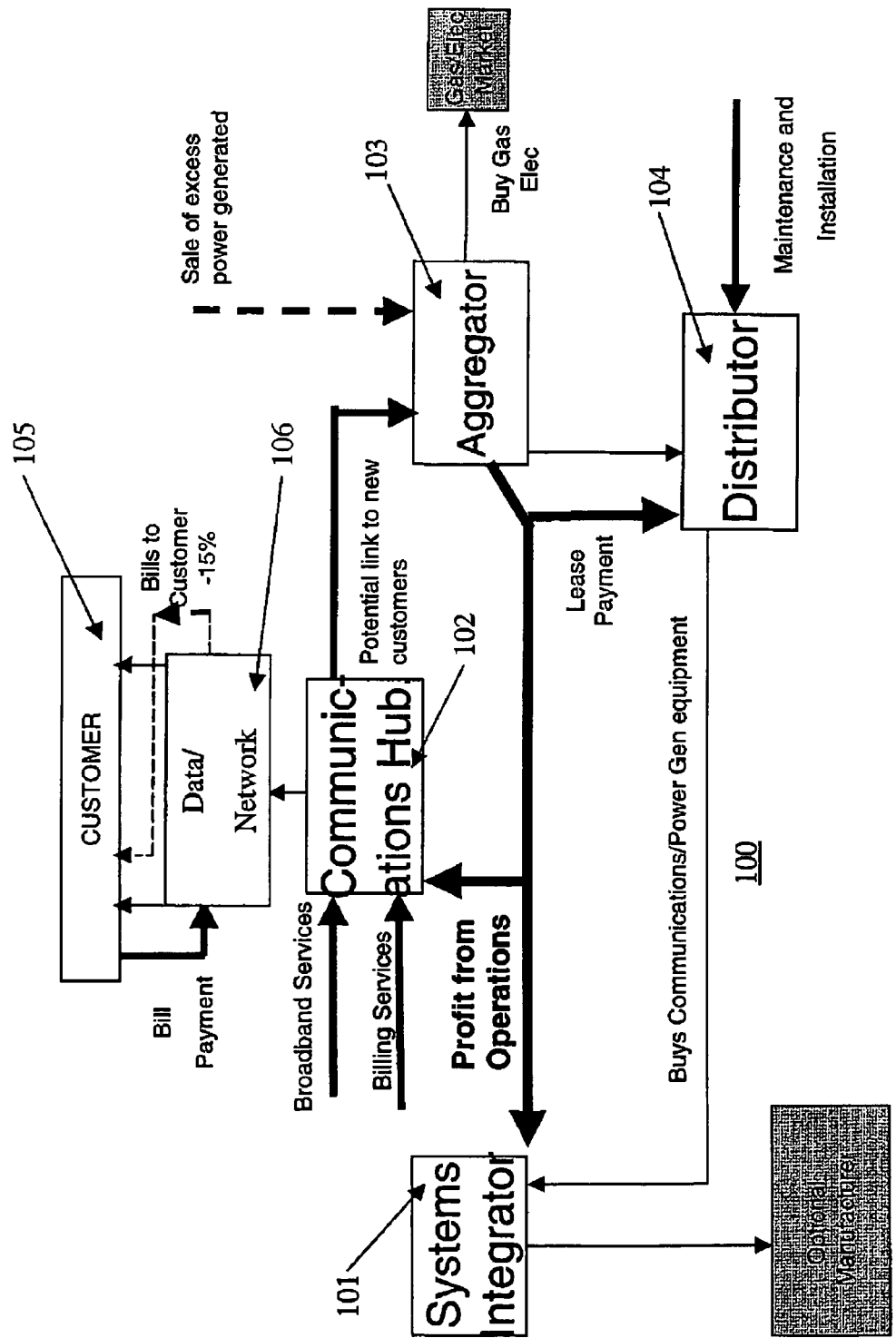
FIG. 1 is a block diagram of one embodiment of a system incorporating an Aggregator in accordance with the invention.

A preferred embodiment of the invention is now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on."

U.S. patent application Ser. No. 09/553/428, filed Apr. 19, 2000, entitled "Electrical Power Distribution System and Method", disclosed a system for providing electrical power to customers through a distributed network. In that application, one preferred embodiment comprised a power machine (like a fuel cell, for example) that is given, free of charge, to at least one customer. The power machine is placed in and connected to the customer's home. The power machine is then connected to the power grid. When the power from the grid goes off, due to a problem in the grid for example, the fuel cell is turned on to provide the customer with electric power. Alternatively, if the power grid is working properly, the fuel cell can be actuated to provide power to both the load and the grid when economically justifiable.

Referring now to FIG. 1, a general illustration of that system is shown for reference. The system is a combination of five main parts: a Systems Integrator 101, a Communications Hub 102, an Aggregator 103, a Distributor 104, and a Customer 105. The Systems Integrator 101 is responsible for configuring the power machine. The Distributor 104 then buys the power machine from the Systems Integrator 101 and installs the machine in the Customer's home. The Distributor 104 is responsible for maintaining the power machine in the Customer's home. The Communications Hub 102 then provides the data communication network 106 and possibly some data. The remaining element of the system is the Aggregator, which is the subject of this application.

Before discussing the Aggregator in detail, it is important to note that in this system, a critical element is broadband communication circuitry that may be coupled to the power machine. The data communications circuitry combines control circuitry, for starting and stopping the cell, and data transfer circuitry capable of sending data across a network. Such circuitry was disclosed in U.S. patent application Ser. No. 09/594,111, filed Jun. 15, 2000, entitled "Device for Electrical Source Sharing".

Figure 2:
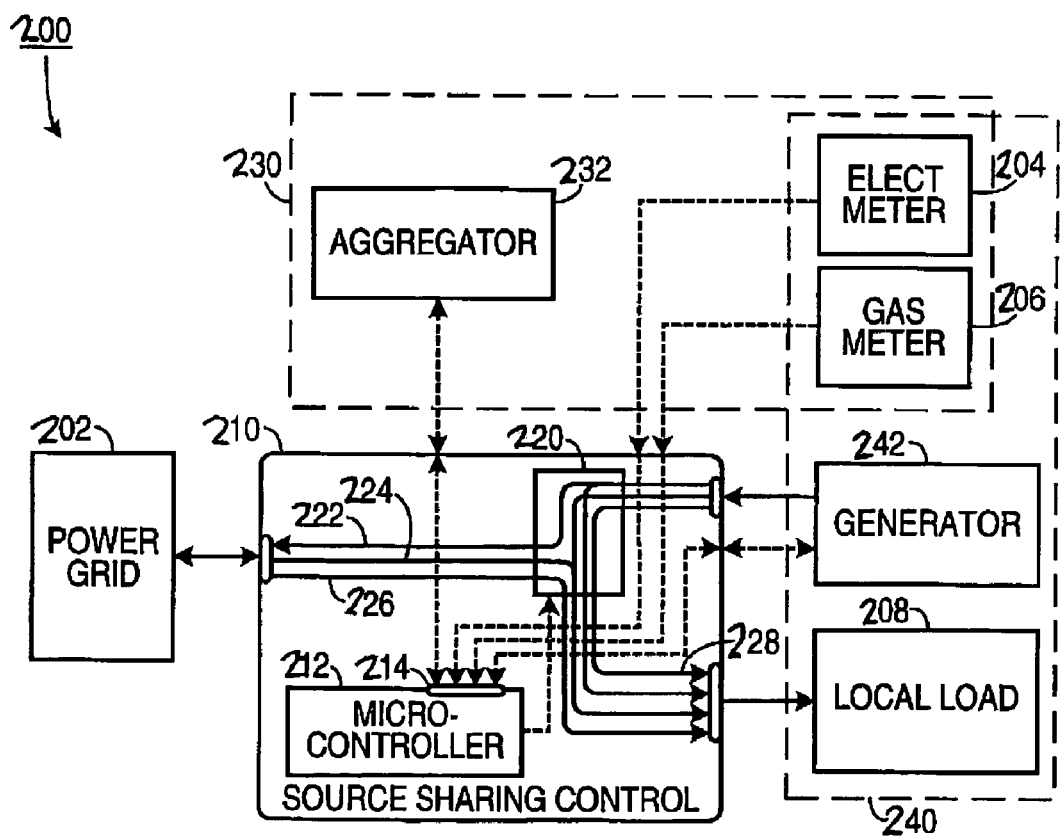
FIG. 2 is a block diagram of an Aggregator and power machine in accordance with the invention.

Referring now to FIG. 2, one embodiment 200 of such circuitry is shown for reference. The circuitry includes a source sharing control circuit 210 that configures power connections between a power grid 202, a local generator 242 and a local load 208. The local generator 242 is the energy-converting device in the power machine. The local generator 242, an electric meter 204 and a fuel meter 206 (such as a gas meter) are at the local site 240.

The source sharing control circuit 210 works as local communications circuitry and receives information from an external data source 230. The source sharing control circuit 210 includes a micro-controller 212 and a power circuit 220 that is capable of configuring power connections within the source sharing control circuit 210 based on instructions received from the micro-controller 212. The micro-controller 212 receives information from the data source 230 via a data port 214 and determines a preferred source sharing configuration based on data received from the data port 214, and instructs the power circuit 220 to effect the preferred source sharing configuration.

Figure 3:
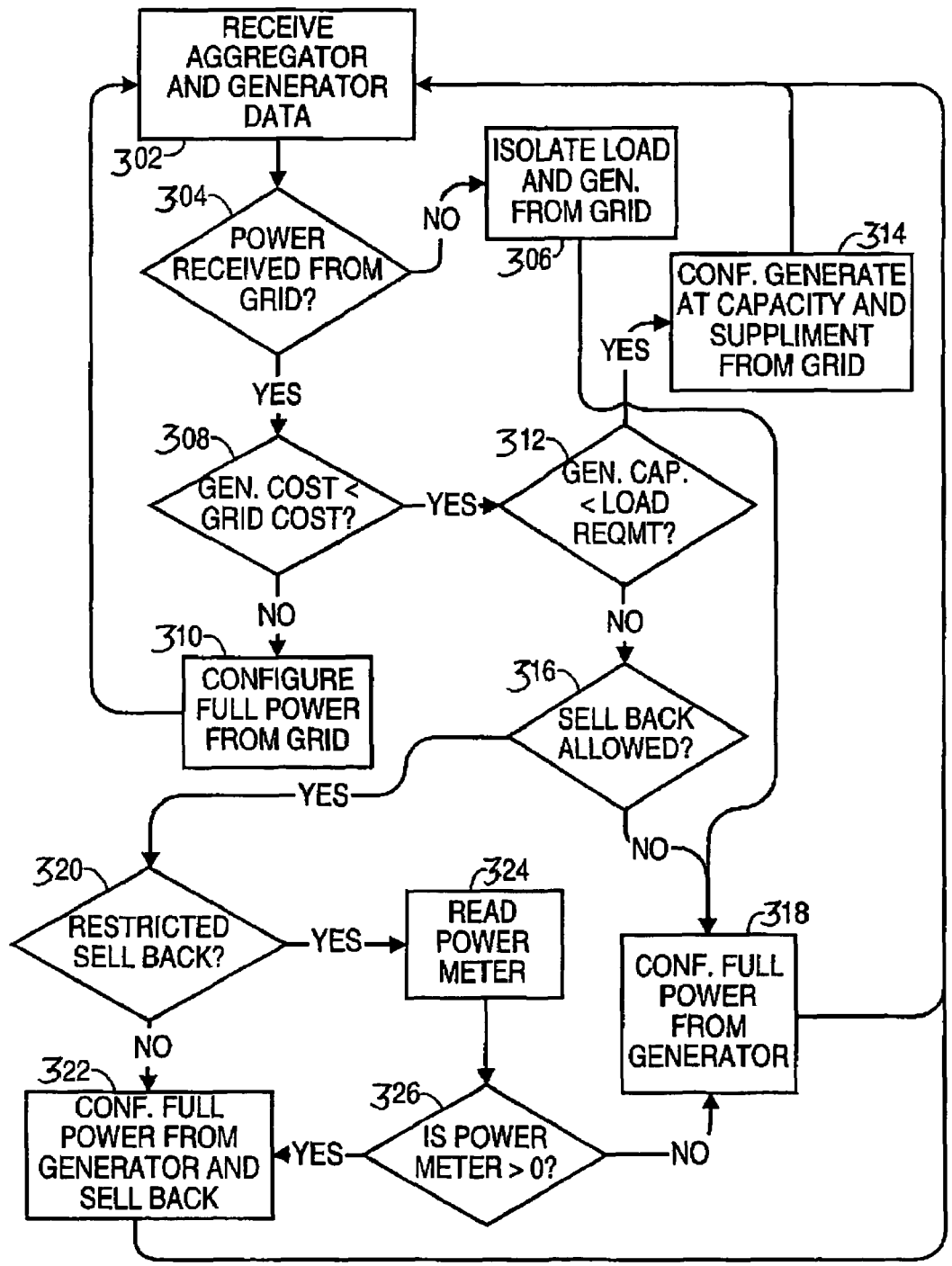
FIG. 3 is a flow chart for local decision making once data from an Aggregator has been received.

Referring now to FIG. 3, one embodiment of a decision tree for the source sharing control circuitry is shown. In this embodiment, the source sharing control circuitry receives data 302 from external data sources, including an Aggregator, which will be discussed later. The source sharing control circuitry determines 304 if there is power on the power grid. If not, the source sharing control circuitry isolates the load from the power grid 306 and then configures the system to fully power the load from the generator 318.

If power is available from the power grid, the source sharing control circuitry determines 308 if the cost of locally generated power is less than the cost of power from the grid. If not, the source sharing control circuitry configures 310 the system so that all power is being received from the grid. If it is economically desirable to generate power locally, the source sharing control circuitry determines 312 if the capacity of the generator is less than the power requirement of the load. If it is, the source sharing control circuitry configures 314 the system so that the generator supplies its full capacity to the load and so that the load is supplemented with power from the power grid.

If the generator capacity is not less than the load requirement, then the source sharing control circuitry determines 316 if sell back of power is allowed. If the selling back of power is not allowed, then the system is configured 318 into the load following mode. If sell back is allowed, the source sharing control circuitry determines 320 if sell back is restricted to putting power onto the grid only if the power meter shows a positive balance on the user's account. This mode is useful in regions that do not require the utility to buy back power from the user, other than to apply a credit to the user's account not to exceed the positive balance in the user's account. If there is no reason to restrict the selling back of power, such as in a fully competitive environment, the source sharing control circuitry will configure 322 the system so that the load is fully powered by the generator and any excess generator power is transmitted to the power grid. If the user is in a region in which selling back is restricted to current positive balance of the power meter, the source sharing control circuitry reads account information stored in the power meter 324 and determines 326 if the user has a positive balance. If the result is that there is a positive balance, the source sharing control circuitry will configure 322 the system so that the load is fully powered by the generator and any excess generator power is transmitted to the power grid. Otherwise, if the power meter indicates that the user does not have a positive account balance, the source sharing control circuitry configures 318 the system so that full power is supplied to the load by the generator.

The preceding discussion describes how local decisions concerning actuation of the power machine are made. As noted, however, before the source sharing control circuitry can begin the decision algorithm, input must be received from an external source. That source can be an Aggregator, which is the subject of this invention and will be fully described in the following paragraphs.

Essentially, an Aggregator is an entity that provides decision data regarding the economic costs involved in receiving power from the power grid and in generating power from the local power machine. For example, the Aggregator could provide the current price of electric power and the current price of fuel (e.g., natural gas) for the generator. The Aggregator, in one embodiment, could simply provide a binary indication of whether current price conditions favor local power generation versus taking power from the grid.

As a simple illustrative embodiment, the Aggregator is coupled to the power machine via a cable modem. Simultaneously, the Aggregator is coupled via a similar means to the electricity power exchange and to the natural gas exchange. Occasionally, the cost of generating electricity from a fossil fuel, such as oil, may be four times the cost of generating electricity from natural gas with a fuel cell. Under these conditions, the Aggregator subtracts the cost of oil-fired electricity from that of fuel cell electricity. Finding a positive difference, the Aggregator sends a "turn on" actuation signal to the power machine through the cable modem. The power machine then imports this signal and processes it per the decision tree in FIG. 3. If local conditions warrant, the control circuitry turns on the generator.

The Aggregator may also receive data relative to a current cost of operating the local generator, such as information concerning: commodity consumption, the efficiency of the local generator, and the health status of control circuit. The Aggregator may communicate with the source sharing control circuitry via the global computer network, via telephone (employing a modem), via satellite communications, via cable, via a local area network, via a paging system, or one of many other types of communication systems. The communications component will also allow a central office, such as one working in tandem with the Aggregator to offer future services through existing and future networks such as cable, telephone, and broadband.

The data sent by the Aggregator to the source sharing control circuitry can be used for actuation of the power machine. For example, as stated, the source sharing control circuitry might include a modem for transmitting data across a telephone, radio, cable, or satellite network. Thus, when the power grid went down, the power machine could be actuated either from a remote location by either sending an "actuate" command across the phone line causing the local communications circuitry to enable the fuel cell or by a local automatic process as previously described.

The Aggregator can send information to the unit directly, thereby delegating the actuation decision to the source sharing control circuitry coupled to the power machine. When this information is transmitted, the power machine must use the information about itself, including efficiency, local weather information, local rate structure, and the like to make the actuation decision. In the alternative, when the Aggregator wants to override the electronic circuitry and make the actuation decision itself, the power machine must transmit this data to the Aggregator. In either case, calculations are made that utilize location specific data to make the final actuation decision.

Referring again to FIG. 1, the Aggregator 103 is the most complicated block in the system. The Aggregator 103 first leases the power machines from the Distributor 104. Once the Aggregator 103 has acquired a leasehold on the power machines, the Aggregator 103 then solicits customers for the power machine. The Aggregator 103 offers the machines to the Customer 105 free of charge. Once the Customer 105 accepts, the Aggregator 103 contacts the Distributor 104 to have the device installed in the Customer's home. The ability to turn the power machine on and off can be retained by the Aggregator 103.

Once the power machine is in the home, the Aggregator 103 can actuate the machine for one of several economic reasons: first, if the power grid goes down, either the power sensing transfer switch, or the Aggregator 103, actuates the power machine to power the Customer's home. This actuation makes power in the home 99.9999% continuous (in contrast with the typical grid reliability average of 99.90%). In this fashion, the Customer 105 has a reliable source of power and never suffers a blackout. Power is delivered to the Customer 105 at all times, either from the grid or the power machine. This high level of quality may demand a premium over normal power distribution.

Second, the Aggregator 103 may actuate the power machine, or in the alternative send actuation data for local processing by the power machine, supply power to the grid for market reasons. While the grid is working properly, the Aggregator 103 monitors the price of electricity and natural gas on the wholesale market. Occasionally, the Aggregator 103 will notice that the price of electricity (being generated by traditional means like coal-fired steam) greatly exceeds the cost of electricity generated from natural gas using a fuel cell. Such a situation might occur in the south in the summertime when many air conditioners are running and demand for natural gas is generally low. When such a market conditions occurs, the Aggregator 103 stands to generate a profit for business by selling power from the power machines to the grid. Under such conditions, the Aggregator may actuate the power machines either to supply the local load or to aggregate the power and sell it on the wholesale market.

In the instance where selling power back to the grid is not possible, the Aggregator 103 may actuate the unit when it is simply less expensive to make power from a hydrocarbon rather than buy it from the grid. Under this condition, the Aggregator 103 acts either as a self-sustaining marketer or in partnership with the local gas utility. The Aggregator 103 produces electricity from a hydrocarbon like natural gas and sends a bill directly to the customer. The customer still receives a bill from the utility for power consumed per the traditional means, but the bulk of the customer's electricity consumption would be reflected in the bill for natural gas. As the decision to produce electricity from gas was made because it was the cheaper means, it is understood that the sum of the gas and electricity bill would be lower than the traditional electric bill.

Another task that the Aggregator 103 may take care of is monitoring the power machine. As the Aggregator 103 maintains a link to the power machine via the local communications circuitry, the Aggregator 103 is able to run diagnostics on the power machine to determine if it is functioning properly. If the Aggregator 103 determines that the machine is not functioning properly, the Aggregator 103 notifies the Distributor 104 that a service call must be made. In such a case, the Aggregator may notify the local communication circuitry that problems with the machine have been detected.

As stated, the Aggregator 103 performs more functions that any other part of the system 100, including generating an opinion as to whether to turn the power machine on and off. While this decision is based on a variety of factors, in one preferred embodiment, there are two predominant factors: customer demand and market price. The customer demand switching has been explained, but the market price switching warrants further discussion.

As the Aggregator can control the operation of the power machine, the Aggregator is in a unique position to sell power to the power grid when the customer demand, e.g. a blackout, is absent. Thus, if in a peak summer month, when air conditioners are running, the Aggregator finds that it is profitable to sell power on the open market, the Aggregator is free to turn on all of the power machines to supply power to the grid. In this fashion, the Aggregator actuates the machine in response to market prices. As the Aggregator has control of numerous power machines, it is in a position to sum excess supply not being consumed by the customers and selling it in blocks through one of the many wholesale power exchanges. Alternatively, the Aggregator may sell the excess directly to another wholesale consumer.

By way of example, as the power machines represent a distributed network, the Aggregator may actuate the power machines en masse and then sell the power in a lump sum to a utility or on the open power market. As energy flows indistinguishably and continuously, if the Aggregator decides to sell 100 kW, for example, the Aggregator may actuate a sufficient number of power machines that produce, in sum, that 100 kW. This corresponding "bulk" power can then be sold on the open market.

Several factors might influence the sell decision, which would be based on information received from an energy or fuel meter (such as current account balance) and data from the market (such as fuel and electricity prices). It is entire possible that the Aggregator generate power to avoid utility pricing, but it is equally likely that the Aggregator will sell to the market. For example, if the economics of selling power to the utility are unfavorable at the power exchange, but if the cost of producing power locally was less that the cost of taking power from the grid, the system typically would maximally drive the load from the local power machine. Factors that would influence such a decision include, but are not limited to: transmission costs, distribution costs and market prices.

The Aggregator may operate in many different environments. Examples of possible environments include the traditional environment, the transitional environment and the competitive environment. The conventional environment occurs where a central, regulated utility controls power distribution. A transitional environment is one in which power generation, distribution, transmission and retail sale have been deregulated, but the power grid remains under regulatory control of a transmission commission. In a competitive environment, all modes of electricity generation, distribution, transmission, and retail sale are unregulated. The Aggregator may have different characteristics in each of the environments.

For example, in a traditional environment, a central utility controls access to the power grid. In such an environment the Aggregator may not be able to sell power to the grid. In this environment, Aggregator activities include calculations of market data, local rates, demand, supply and the like. The Aggregator also transmits actuation data to the power machine.

In traditional environments, the utility is a regulated monopoly. Thus, not only is the price of electricity regulated, access to the grid is also limited. The utility can limit this access via interconnection requirements and via requirements that do not allow the meter to run meter backwards (i.e. supply power to the grid). In such an environment, the Aggregator may engage in load shedding or peak shaving.

In the traditional market, (i.e. a regulated monopoly) there is no opportunity for aggregation of excess power generated locally for sale in the wholesale market. The Aggregator 103 may participate, however, in a "load shedding program" with local utilities. Under load shedding, the Aggregator 103 generates power at the retail customer's site during periods of high supply cost for the local utility. In so doing, the Aggregator 103 saves the utility money in that the utility does not have to supply power to customers with conventional methods during periods of high cost.

The rationale behind load shedding is that unlike utilities, the retail customers are shielded from price fluctuations. These high cost periods may be a result of unexpectedly hot weather, inaccurate demand planning, or events concerning infrastructure (loss of transmission or generation assests-storms). These conditions may exist either in the local area or on the national market. Typically, utilities would be forced to pay very high "spot" (market) prices for unexpectedly needed electricity. Assuring the utility that some of the demand will be satisfied during any number of adverse conditions mitigates some of the risk from these events. The risk reduction thus has value to management. The Aggregator may negotiate terms of the deal in markets where appropriate. The Aggregator may also ensure the actuation of power units if any predetermined high cost supply situation arises.

Peak shaving, in comparison, is a type of load shedding in which the local utility market is not the area of high cost. Under this type of arrangement, the Aggregator monitors prices on all power exchanges waiting for situations where demand exceeds supply. This can occur for all the reasons discussed in the load shedding explanation. When prices reach a certain level in individual regional markets, utilities gauge their local load versus either contractual deliveries or generation capacity to determine whether if excess exists.

Under such situations, the Aggregator may negotiate arrangements with the local utilities to relieve them of demand during the selling opportunities on the open market. In addition, where negotiated, the Aggregator may negotiate to supplement the local utility by adding excess power to the grid, running the retail customers meter backwards, or allowing the local utility to sell even more of its previously allocated supply to the high cost market. The Aggregator may be rewarded with a percentage of the revenue captured by the utility that directly relates to the amount of power supplied to the high cost market and the price received for it minus the gas commodity cost to produce it.

In a transitional environment by contrast, electricity distribution has been somewhat dergulated and has thus begun to become competitive. The traditional utility has started to "unbundle" itself into separate functions such as generation, transmission and distribution, retail customer management, metering, and the like. Hence, the Aggregator now has the ability to service the customer by signing up as a retail manager. In this capacity, the Aggregator may also be known as a "gas or electricity marketer". The Aggregator's activities can now include load shedding, peak shaving, reliability analysis (except they now gain all the proceeds rather than negotiate with a utility), compilation of billing data and bill preparation and presentation, energy portfolio risk management and value added service revenue. The Aggregator may perform financial calculations including account status, recent payments, accounts receivable, and the like. If both the electricity and gas markets are deregulated, the Aggregator may become a surrogate utility to the consumer and thereby make economic decisions based upon the gas portfolio, electricity portfolio, market conditions, and retail and wholesale generation assets.

When one moves into the transitional environment, the decision to generate electricity becomes more complex. In a transitional market, there is still a regulatory agency, but regulatory role is now related to splitting the old utility's assets into competitive components in a fair and timely manner. Essentially, the old utility concept may become a transmission and distribution company. In this scenario, the remaining assets (generation, meters, and the like) are sold off. The transmission and distribution (hereinafter "T&D") company's new source of revenue is solely derived from power crossing their lines (known as "wheeling") to other utilities or the marketers. Typically the T&D is given a rate scenario by the regulating agency in the form of a rate cap or a revenue cap. This is known as making performance based rates.

Under a revenue cap, the T&D is guaranteed a constant revenue stream regardless of how much power crosses their lines. The cost is passed along to the customers through the marketers typically as a flat rate charge that varies slightly from month to month. This is a very friendly situation to the Aggregator.

Under a price cap, by contrast, the T&D is guaranteed a certain price per kilowatt of power transmitted or distributed across it's network. As the regulatory charge is based upon a fixed dollar amount per kilowatt basis, when the Aggregator actuates the power machine at the local site, the T&D is deprived of revenue. This is not a local generation friendly senario.

In either situation, rate or price cap, any money saved through additional efficiency in the T&D's operations becomes its to keep. This contrasts the downward rate adjustment that would have occurred in the a traditional environment.

A final difference in the transitional case (from the traditional market) is that there are usually Competitive Transition Charges (CTC) or Stranded Asset Recovery (SAR) charges. These are meant to help the previously regulated utility fully depreciate any investments made prior to deregulation at an accelerated pace. Once these charges are paid, they are gone forever. As with the transmission wheeling charges, these CTC and SAR charges may take the form of a flat rate for every customer (not preferred since they are usually $10-25 and poorer households who generally use less energy pay equal portions) or a $per Kw charge which is more typical.

Again the structure of this charge and whether it is avoidable or not becomes a decision point for the aggregator.

Since the Aggregator may also be the "marketer" of gas or electricity in the transitional markets there is an added benefit from the fact that the meters may be run in to the negative number range. This means that the power machines may supply power not only to a local load, but also to the power grid. The Aggregator's decision now involves whether to make power for the local load, to generate excess for either sale on the open market or to other local customers, to generate from a variety of wholesale sources (such as coal or Nuclear), or to buy contracts from other suppliers on the open markets.

Inputs to this decision include prices of the commodities in all exchanges (local and national), cost to covert to electricity locally, cost to deliver power from a wholesale source (either theirs or another companies), cost to sell bundled power on the market to another customer, and data of the Aggregator's current trading portfolio of energy contracts. In addition, the decision must consider the rate structure of the T&D company (Rate cap vs. Revenue cap) and the regulatory charges (CTC, SAR).

The fully competitive environment differs from the transitional in that the CTC or SAR charges no longer exist. The power machine actuation decision criteria and market opportunities are the same as in the transitional environment. The Aggregator still benefits from charging premiums for reliability, power quality, power management, and still enjoys more effective risk mitigation of their trading operations. Having generation assets on both the supply and demand side of the market is a tremendous advantage in this case.

Figure 4:
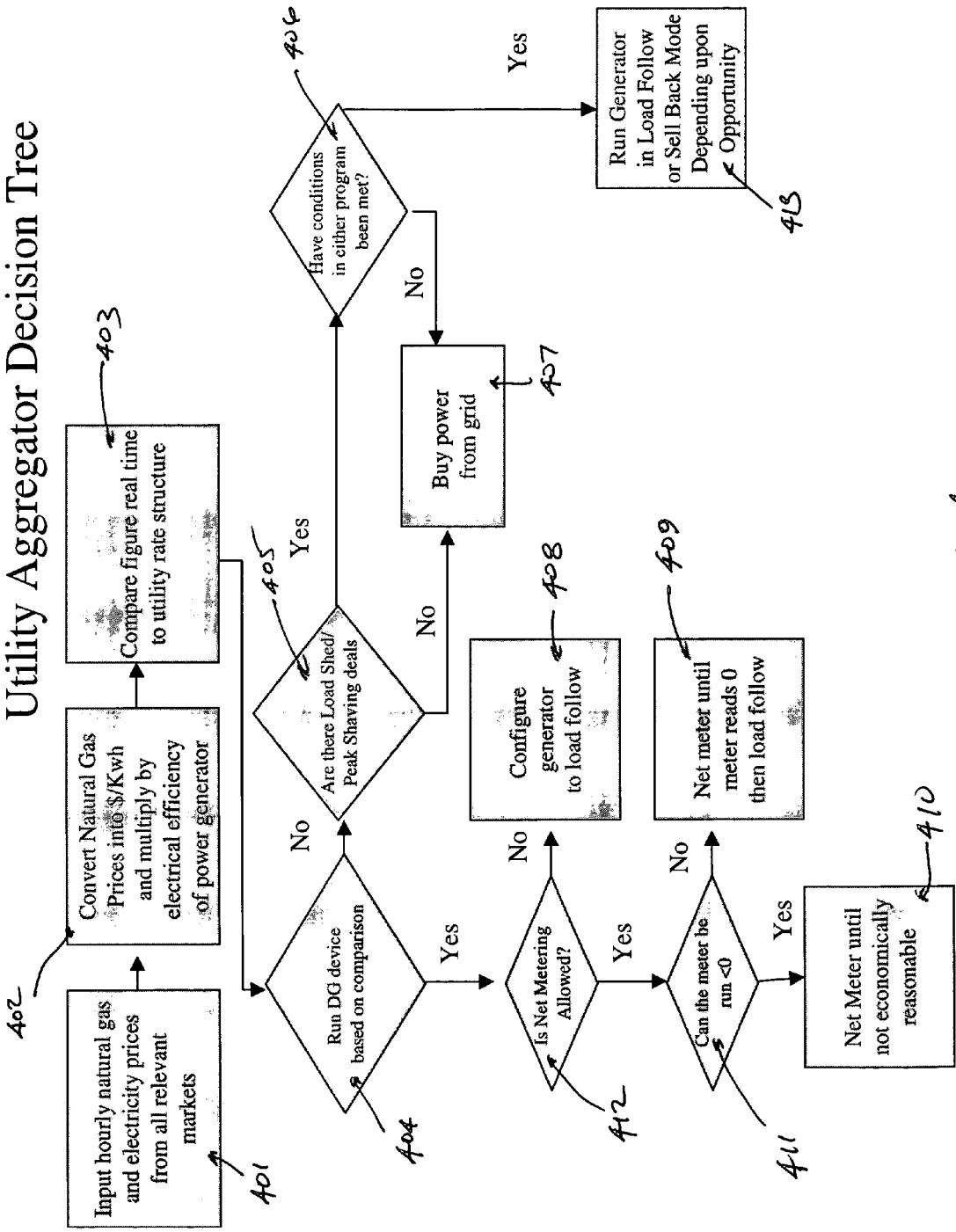
FIG. 4 is a decision tree illustrating a preferred embodiment of an actuation decision process in accordance with the invention.

Referring now to FIG. 4, illustrated therein is one embodiment of a decision flow chart in accordance with the invention. FIG. 4 illustrates a preferred embodiment for generating the actuation signal incorporating the functions and environments discussed above. Step 401 indicates the monitoring activity of the electricity and natural gas markets. This may be done through a common internet connection like a T1 ISDN line.

Once the prices are input, they are standardized by converting the dollar amounts to power rates in step 402. This conversion incorporates the efficiency of the power machine as well. The rates of generation from natural gas versus coal-fired steam are then compared. For example, if electricity is $0.10 per kW/h, and natural gas is $0.20 per kW/h, but the power machine is only 50% efficient, the prices are approximately equal.

If there is a sufficient difference, step 404 indicates that an actuate signal will be sent to the power machine. While the actuation signal may be sent at this time, other factors can be considered as well, including whether net metering is allowed (step 412) and whether power can be sold to the grid causing the meter to run backwards (step 411). Where there is an insufficient difference, other factors including load shedding and peak shaving (step 405) are considered as they may still cause an actuation signal to be sent. FIG. 4 is for exemplary purposes and many other decision flow charts will be apparent to those skilled in the art.

While the preferred embodiments of the invention have been illustrated and described, it is clear that the invention is not so limited. Numerous modifications, changes, variations, substitutions, and equivalents will occur to those skilled in the art without departing from the spirit and scope of the present invention as defined by the following claims. For example, the Aggregator may include additional data in the actuation calculation including fossil fuel discovery rates, drilling yields and other data related to search and discovery of fossil fuel fields.

What is claimed is:

1. A system for operating power machines, comprising:
 a. a plurality of power machines, the power machines each comprising control circuitry coupled thereto; and
 b. a remote means for actuating the power machines comprising:
  i. a means for monitoring a market price of electricity;
  ii. a means for monitoring a market price of hydrocarbon fuels; and
  iii. a means for calculating the difference between the market price of electricity and the market price of hydrocarbon fuels;
 wherein after the remote means for actuating the power machines transmits an actuation signal to the power machines, the control circuitry evaluates local data stored therein prior to actuating the power machines.

2. The system of claim 1, wherein the means for actuating the power machine network comprises means for transmitting an actuation signal across a communications means to a power machine.

3. The system of claim 2, wherein the actuation signal comprises a remote override signal causing the power machine to turn on or turn off.

4. The system of claim 3, further comprising a means for reading data from a meter.

5. The system of claim 4, further comprising a means for reading data related to the operational performance of the power machine.

6. The system of claim 5, further comprising a means for reading the local energy rate structure.

7. The system of claim 6, further comprising a means to calculate the load demand and to print and prepare a billing statement.

8. A system for generating power machine actuation data, comprising:
 a. a plurality of power machines, the power machines each comprising control circuitry coupled thereto, wherein the control circuitry comprises:
  i. a means for monitoring local data; and
  ii. a means of considering electricity generation factors;
 b. a remote means for actuating the power machines comprising:
  i. a means of comparing the market price of electricity and hydrocarbon fuel;
  ii. a means of transmitting an actuation signal; and
  iii. a means of transmitting an override signal,
  wherein the control circuitry evaluates the local data after receipt of the actuation signal;
  further wherein the control circuitry omits evaluation of the local data upon receipt of the override signal.

9. The system of claim 8, further comprising a means for aggregating power to sell on a power market.

10. The system of claim 9, further comprising a means for generating a billing statement.

11. The system of claim 10, wherein the electricity generation factor is selected from the group consisting of market rate structure, peak shaving information, load shedding information and information relating to the ability to sell power to the grid.

12. The system of claim 11, wherein the system operates in an environment selected from the group consisting of a traditional environment, a transitional environment, and a competitive environment.

13. The system of claim 12, further comprising a means to calculate the load demand and to print and prepare a billing statement.

14. The system of claim 13, further comprising a means for selling power to the grid.

15. The system of claim 14, wherein the system participates in load shedding.

16. The system of claim 14, wherein the system participates in peak shaving.

17. The system of claim 14, wherein the data is selected from the group consisting of electricity prices, hydrocarbon prices, resource rate structure, power machine efficiency, power machine operating characteristics, futures prices, environmental data, regulatory rules, load demand, and weather.

18. The system of claim 13, further comprising a distributor capable of licensing the power machines.

19. The system of claim 14, wherein the distributor monitors the operational condition of the power machines.

* * * * *